United States Patent
Iwaszkiewicz

(10) Patent No.: US 7,257,950 B2
(45) Date of Patent: Aug. 21, 2007

(54) DIESEL ENGINE CHARGE AIR COOLER BYPASS PASSAGE AND METHOD

(75) Inventor: Titus J. Iwaszkiewicz, Plainfield, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 77 days.

(21) Appl. No.: 11/226,537

(22) Filed: Sep. 14, 2005

(65) Prior Publication Data

US 2007/0056282 A1    Mar. 15, 2007

(51) Int. Cl.
 *F02B 33/44* (2006.01)
 *F02B 29/04* (2006.01)
 *F02M 25/07* (2006.01)

(52) U.S. Cl. .................. 60/605.2; 60/612; 60/599; 123/563; 123/568.11; 123/568.12; 123/568.2

(58) Field of Classification Search ............... 60/599, 60/605.1, 605.2, 602, 611, 612; 123/563, 123/568.11, 568.12, 568.2; F02B 29/04
See application file for complete search history.

(56) References Cited

U.S. PATENT DOCUMENTS

| | | | | |
|---|---|---|---|---|
| 2,896,598 A | * | 7/1959 | Reggio ................. | 123/563 |
| 4,385,496 A | * | 5/1983 | Yamane ................ | 60/599 |
| 4,716,734 A | | 1/1988 | Nakao et al. .......... | 60/599 |
| 4,961,404 A | * | 10/1990 | Itakura et al. ......... | 123/563 |
| 6,062,027 A | * | 5/2000 | Landfahrer et al. .... | 60/605.2 |
| 6,134,888 A | * | 10/2000 | Zimmer et al. ......... | 60/605.1 |
| 6,470,864 B2 | * | 10/2002 | Kim et al. ............. | 60/605.2 |
| 6,868,840 B2 | * | 3/2005 | Lewallen ............... | 123/563 |
| 7,004,154 B2 | * | 2/2006 | Joyce et al. ........... | 123/563 |
| 7,152,588 B2 | * | 12/2006 | Corba .................. | 123/563 |
| 7,163,005 B2 | * | 1/2007 | Tussing et al. ........ | 123/568.12 |
| 2006/0064981 A1 | * | 3/2006 | Kojima et al. ......... | 60/612 |
| 2006/0162692 A1 | * | 7/2006 | Irisawa ................. | 60/599 |

FOREIGN PATENT DOCUMENTS

| | | | |
|---|---|---|---|
| DE | 3627686 A1 | * | 11/1987 |
| DE | 4240239 A1 | * | 6/1994 |
| GB | 2055963 A | * | 3/1981 |
| JP | 57195820 A | * | 12/1982 |
| JP | 61058917 A | * | 3/1986 |
| JP | 61190114 A | * | 8/1986 |
| JP | 03117649 A | * | 5/1991 |
| JP | 2002332887 A | * | 11/2002 |

* cited by examiner

*Primary Examiner*—Thai-Ba Trieu
(74) *Attorney, Agent, or Firm*—Elias P. Soupos; Susan L. Lukasik; Jeffrey P. Calfa

(57) ABSTRACT

An internal combustion engine (100) includes a turbocharger (107) having a turbine (109) and a compressor (111). A charge-air cooler (121) is in fluid communication with an outlet (117) of the compressor (111) through a hot-air passage (123). An intake throttle (127) is in fluid communication with an outlet (125) of the charge-air cooler (121) through a cool-air passage (129). A junction (137) is located downstream of the intake throttle (127). An intake system (103) and an exhaust gas recirculation system (131, 133, 135) are in fluid communication with the junction (137). A bypass passage (139) containing an orifice (141) fluidly connects the hot-air passage (123) and the intake system (103).

19 Claims, 4 Drawing Sheets

DIESEL ENGINE CHARGE AIR COOLER BYPASS PASSAGE AND METHOD

FIELD OF THE INVENTION

This invention relates to intake air conditioning for internal combustion engines, including but not limited to intake air conditioning for engines having at least one turbocharger and an intake air cooler.

BACKGROUND OF THE INVENTION

Internal combustion engines having intake air coolers are known. Typical engines having turbochargers use intake air coolers between compressors, or between a compressor and an intake manifold. Intake air coolers lower the temperature of incoming air to the engine cylinders. Typically, air passes through an air filter before entering a compressor or a supercharger. The compressor compresses the air, resulting in the air exiting the compressor being at a higher pressure and temperature than air entering the compressor.

Compressed air is either sent directly to the intake manifold of the engine, or cooled in an intake air or charge air cooler disposed between the compressor and the intake manifold. Cooling the air is normally advantageous to the operation of the engine because it helps lower emissions, especially if the engine is a compression ignition or diesel engine.

For a compression ignition engine having at least one turbocharger and an intake air cooler, operation of the engine at or around idle is difficult to optimize for various reasons. First, because low temperature air flows into the engine through the intake charge air cooler, under low ambient temperatures, the air entering the intake manifold may be over-cooled and, when an exhaust gas recirculation (EGR) system is utilized, cause excessive carbon deposits on the EGR valve and intake sensors. Second, low intake air temperatures at engine idle conditions may result in undesirable white smoke and odors in the exhaust of compression ignition engines due to incomplete combustion of the fuel.

Intake throttle or idle-air bypass valves are known in spark ignition or gasoline internal combustion engines. Some modern spark ignition engines use a bypass valve to bypass an intake throttle and control an amount of air consumed by the engine during an idle condition. Similarly, some spark ignition engines may bypass an intercooler during idle as, for example, the engine described in U.S. Pat. No. 4,716,734 by Nakao et al. Such an engine may have a supercharger or a turbocharger with an intercooler. An air flow control valve is used to bypass the intake throttle and the intercooler on the engine. Engines like these require flow modulation capability in the intake throttle bypass because the amount of air entering the engine determines the speed of the engine. The bypass air capacity of this bypass system is only capable of handling a relatively small amount of air flow, adequate for engine idle. An idling speed control system, such as shown in Nakao et al. is expensive and complicated because it not only requires an actuator, but it also requires structure for controlling the amount of air allowed to enter the engine because the amount of air entering the engine determines the speed of the engine.

Accordingly, there is a need for a system for use with a compression ignition engine that will control cooling of the intake air for an engine, avoid excessive carbon deposits in the intake system, reduce white smoke in the exhaust during idle, and be cost effective and simple.

SUMMARY OF THE INVENTION

The following describes an apparatus for and method of bypassing a charge air cooler in a turbocharged diesel internal combustion engine. The diesel engine may have an intake throttle device, and may additionally have one or more turbochargers. A bypass air passage having a fixed orifice may be used to bypass the charge air cooler and the intake throttle. The bypass air passage is connected between a first location upstream of the charge air cooler and a second location downstream of the intake throttle valve. If an EGR system is employed, the bypass air path may be connected upstream of the EGR valve and may advantageously be directed toward an outlet of the EGR system. Warm air from the bypass passage directed toward the outlet of the EGR system may advantageously reduce condensation of hydrocarbons at a point of introduction of EGR gas, and help mixing of intake air and exhaust gas.

A diesel engine includes a turbocharger having a turbine and a compressor. A charge air cooler is in fluid communication with an outlet of the compressor through a hot air passage. An intake throttle is in fluid communication with an outlet of the charge air cooler through a cool air passage. A junction is located downstream of the intake throttle. An intake system and an exhaust gas recirculation system are in fluid communication with the junction. A bypass passage containing an orifice fluidly connects the hot air passage and the intake system.

A method for operating a diesel engine includes the step of analyzing engine operating parameters in an electronic controller. The electronic controller decides on an engine operating condition. When an engine idle operating condition is present, an intake throttle is moved toward a closed position. When an engine above-idle operating condition is present the intake throttle is opened. The idle speed of the engine is controlled by adjusting an amount of fuel injected into at least one cylinder. Air is bypassed around the intake throttle and a charge air cooler through an orifice.

DESCRIPTION OF A PREFERRED EMBODIMENT

The following describes an apparatus for and method of bypassing a charge air cooler in a turbocharged diesel engine. The diesel engine may have an intake throttle device, and may additionally have one or more turbochargers. A bypass air passage having a fixed orifice may be used to bypass the charge air cooler. The bypass air passage is connected between a first location upstream of the charge air cooler and a second location downstream of the intake throttle valve. If EGR is employed, the bypass air path may be connected upstream of the EGR and may advantageously be directed at an outlet of the EGR system. Warm air from the bypass passage directed toward the outlet of the EGR system may advantageously reduce condensation of hydrocarbons at a point of introduction of EGR gas, and help mixing of intake air and exhaust gas.

Figure 1:
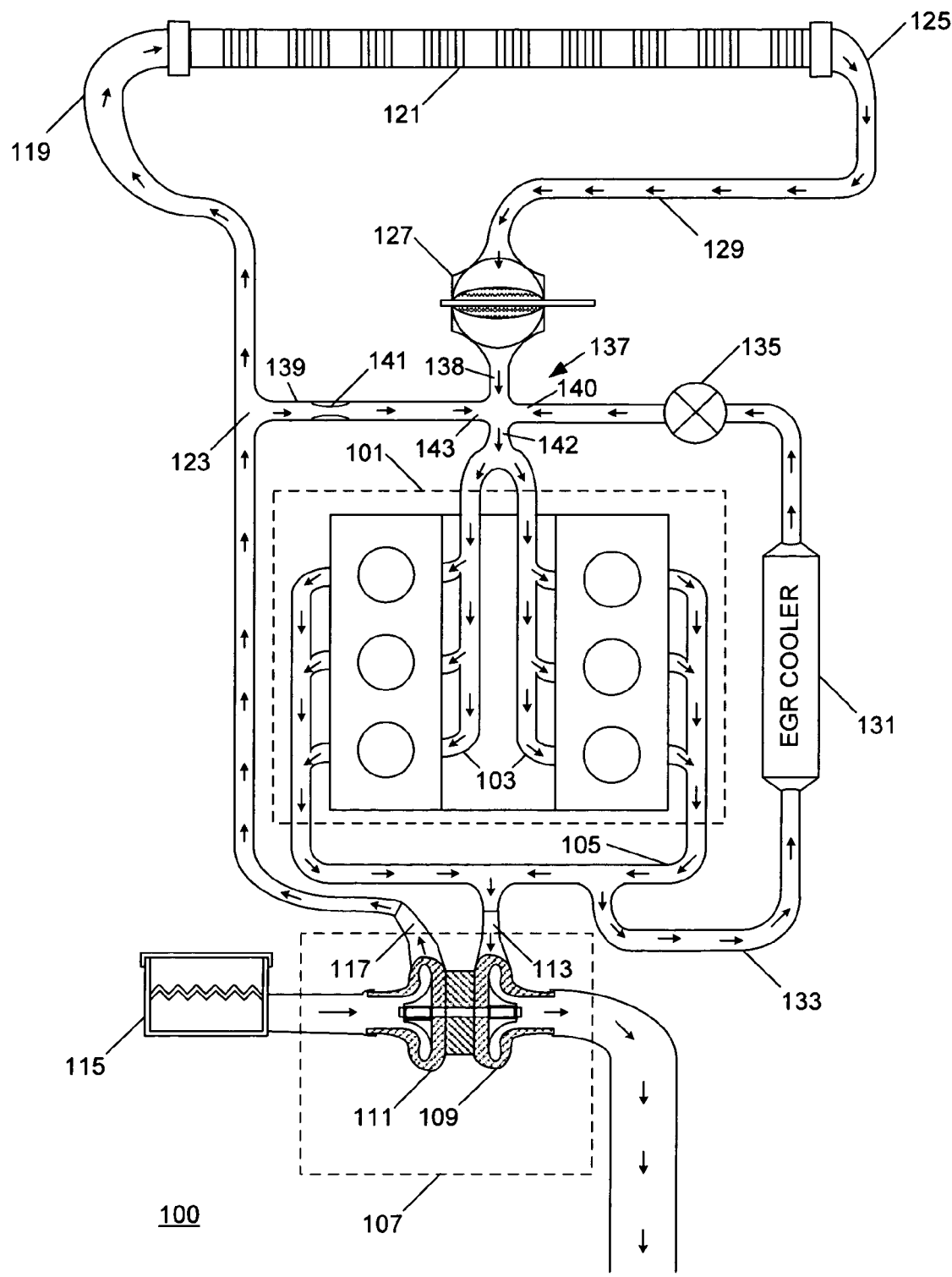
FIG. 1 is a block diagram of a diesel engine having a charge air cooler bypass passage in accordance with the invention.

A diesel engine 100 is shown in FIG. 1. The engine 100 has a crankcase 101 that includes a plurality of cylinders. The cylinders in the crankcase 101 are fluidly connected to an intake system 103 and to an exhaust system 105. A turbocharger 107 includes a turbine 109 having a turbine inlet 113 connected to the exhaust system 105 and a compressor 111 connected to an intake system 103. An air cleaner 115 is connected to an inlet of the compressor 111.

Viewing the intake system 103 in greater detail, an outlet 117 of the compressor 111 is connected to an inlet 119 of a charge air cooler 121 through a hot air passage 123. An outlet 125 of the charge air cooler 121 is connected to an intake throttle 127 through a cold air passage 129.

An EGR cooler 131 is connected to the exhaust system 105 through an EGR passage 133. Downstream of the EGR cooler 131 is an EGR valve 135. The EGR valve 135 may alternatively be connected upstream of the EGR cooler 131 in the EGR passage 133. On an outlet side of the EGR valve 135 is a mixing junction 137 having three inlets and one outlet. A first inlet 138 is connected to the intake throttle 127. A second inlet 140 is connected to the EGR valve 135. The outlet 142 is connected to the intake system 103. During normal engine operation, cooled intake air enters the mixing junction 137 through the first inlet 138, and mixes with exhaust gas entering the junction 137 from the second inlet 140. A mixture of exhaust gas and air exit the junction 137 from the outlet 142 and enter the intake system 103.

A bypass passage 139 containing a flow orifice 141 is connected between the hot air passage 123 and the third inlet 143 of the mixing junction 137. The bypass passage may alternatively be connected directly to the intake system 103 downstream of the junction 137, or at another location upstream of the junction 137 but still downstream of the intake throttle 127. In the case where the bypass passage 139 has a variable flow rate control capability, it may be adequately sized to handle airflow for the engine 100 over a wide range of speeds and loads.

When the engine 100 operates at or near an idle condition, when engine speed is low and there is little to no torque load on the engine, the intake throttle may be completely closed 127 while the EGR valve 135 may be open. Air from the compressor 111 flows through the bypass passage 139 and enters the junction 137. Air from the bypass passage 139 mixes with exhaust gas from the EGR valve 135 and exits the junction 137. The mixture of air and exhaust gas exiting the junction 137 must be adequate to maintain a stable idle speed of the engine 100 during idle. The idle speed of the engine 100 is the RPM of the engine, and is controlled by an amount of fuel injected into the plurality of cylinders. Provided that sufficient air is available, the idle speed of the engine 100 does not depend on the quantity of air passing through the bypass passage 139.

When the engine 100 operates above an idle condition, the intake throttle 127 is substantially or more than 5% open. Cooled intake air exiting the charge air cooler 121 enters the junction 137 and mixes with hot air coming from the bypass passage 139 and exhaust gas coming from the EGR valve 135. The mixture of air and exhaust gas exits the junction 137 and enters the intake system 103 of the engine 100.

The orifice 141 advantageously ensures that only a small amount of hot air coming from the hot air passage 123 is consumed by the engine 100 during operation above the idle condition while providing for a proper amount of air to enter the engine 100 during the idle condition. Additionally, the orifice 141 advantageously lowers the intake pressure drop from the compressor outlet 117 of the engine 100 to the intake manifold during the idle condition, because the air consumed by the engine 100 during the idle condition does not pass through the charge air cooler 121, thereby resulting in higher air temperatures and lower loss of pressure. The speed of the engine 100 during the idle condition is determined by an amount of fuel injected into the plurality of cylinders, i.e., the flow rate of air passing through the flow orifice 141 advantageously does not require modulation or adjustment to control the speed of the engine 100 during the idle condition.

Figure 2:
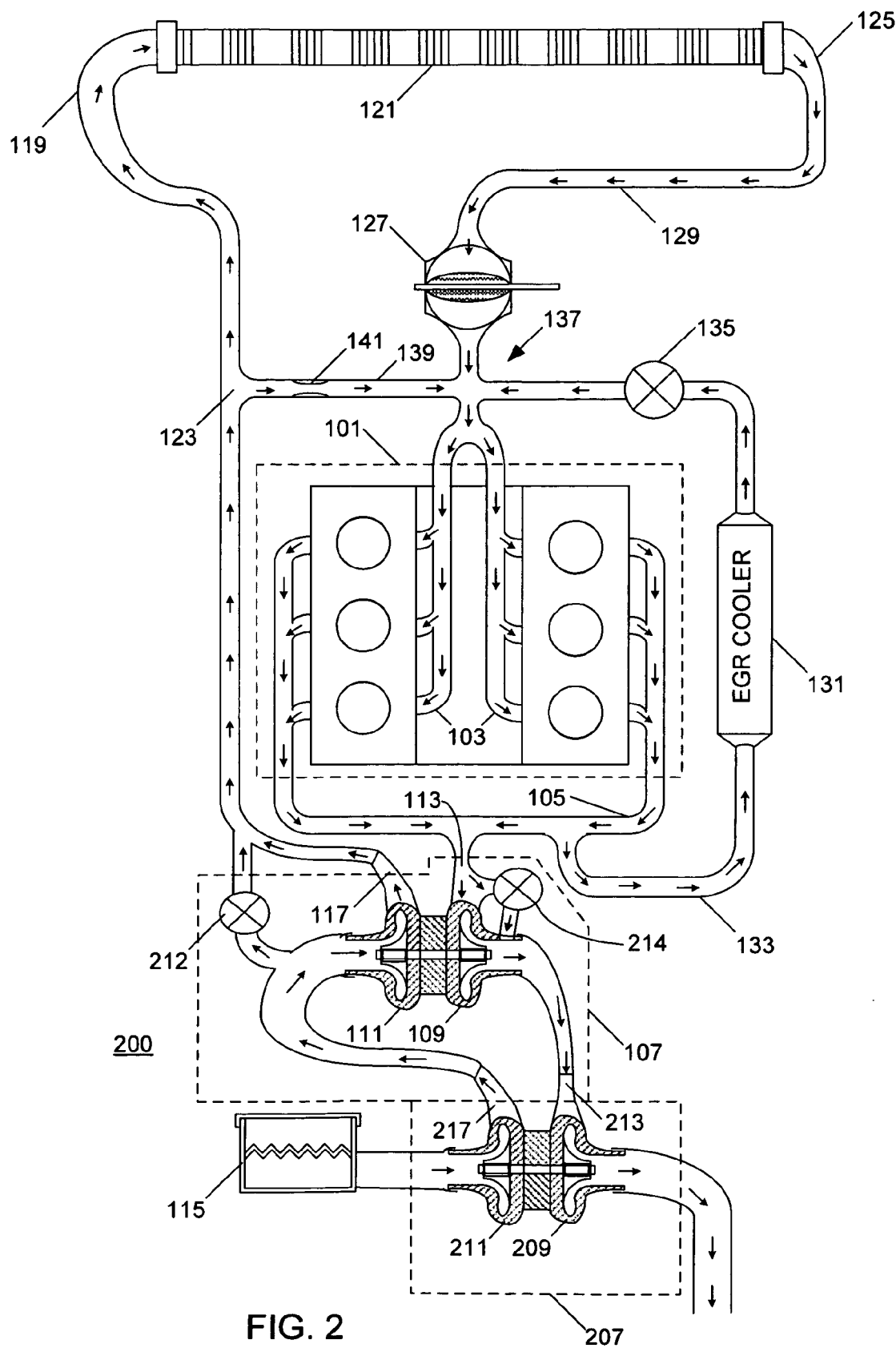
FIG. 2 is a block diagram of a diesel engine having a charge air cooler bypass passage and two turbochargers in accordance with the invention.

A diesel engine 200 having a second turbocharger 207 in series with turbocharger 107 is shown in FIG. 2. The engine 200 has an inlet 213 of the second turbine 207 connected to an outlet of the first turbine 109. An outlet 217 of a second compressor 211 is connected to the inlet of the first compressor 111. The air cleaner 115 is connected to an inlet of the second compressor 211 instead of the inlet of the first compressor 111. A compressor bypass valve 212 may be connected between the outlet 217 of the second compressor 211 and the outlet 117 of the first compressor 111. Similarly, a turbine bypass valve 214 may be connected between the inlet 113 of the first turbine 109 and the inlet 213 of the second turbine 209.

The intake throttle 127, the EGR valve 135, and other engine components may be electronically controlled and connected to an engine controller (not shown). The engine controller may monitor engine operating parameters to determine an appropriate position of the intake throttle 127 and the EGR valve 135. Moreover, the first turbocharger turbine 109 and/or the second turbocharger turbine 209 may be capable of variable flow area. The engine controller may be capable of determining an appropriate position for one or more turbine actuator(s) that control the flow area of the first turbine 107 and/or the second turbine 109. The engine controller may command at least one turbine actuator to move a plurality of vanes inside the turbine housing and constrict flow of exhaust gas in the turbine during an idle condition. The engine controller is also capable of determining engine speed by controlling the amount of fuel injected into the cylinders.

When the engine 200 operates at or near an idle condition, i.e. when engine speed is low and there is little to no torque load on the engine, the intake throttle may be completely closed 127 while the EGR valve 135 may be open. The turbine bypass valve 214 may be closed to allow most of the exhaust gas produced by the engine 200 to flow through the turbine 109. The compressor bypass valve 212 may also be closed, to force almost all of the intake air consumed by the engine 200 to flow through the compressor 111. Air from the compressor 111 flows through the bypass passage 139 and enters the junction 137. Air from the bypass passage 139 mixes with exhaust gas from the EGR valve 135 and exits the junction 137. The mixture of air and exhaust gas exiting the junction 137 must be adequate to maintain a stable idle speed of the engine 100 during idle. The idle speed of the engine 200 is controlled by an amount of fuel injected into the plurality of cylinders. Provided that sufficient air is available, the idle speed of the engine 100 does not depend on the quantity of air passing through the bypass passage 139. Typical idle engine speeds for the engine 100 may be between 650 and 800 revolutions per minute.

When the engine 200 operates above an idle condition, the intake throttle 127 is substantially or more than 5% open. The turbine bypass valve 214 may be partially or fully open to allow a portion of the exhaust gas produced by the engine 200 to bypass the turbine 109 and flow directly into the turbine 209. Similarly, the compressor bypass valve 212 may be partially or fully open to allow a portion of compressed air from the compressor 211 to bypass the compressor 111 and enter directly into the charge air cooler 121. Cooled intake air exiting the charge air cooler 121 enters the junction 137 and mixes with hot air coming from the bypass passage 139 and exhaust gas coming from the EGR valve 135. The mixture of air and exhaust gas exits the junction 137 and enters the intake system 103 of the engine 200.

The orifice 141 advantageously ensures that only a small amount of hot air coming from the hot air passage 123 is consumed by the engine 200 during operation above the idle condition while providing for a proper amount of air to enter the engine 200 during the idle condition. Additionally, the orifice 141 advantageously lowers the intake pressure drop from the compressor outlet 117 of the engine 200 to the intake manifold during the idle condition, because the air consumed by the engine 200 during the idle condition does not pass through the charge air cooler 121, thereby resulting in higher air temperatures and lower loss of pressure. The speed of the engine 200 during the idle condition is determined by an amount of fuel injected into the plurality of cylinders, i.e., the flow rate of air passing through the flow orifice 141 advantageously does not require modulation or adjustment to control the speed of the engine 200 during the idle condition. In the case when the bypass passage 139 has a variable flow capability, the amount of air bypassing the charge air cooler 121 may be increased during operation above the idle condition. The ability to bypass the charge air cooler 121 under favorable conditions, for example, under cold ambient conditions, is advantageous because pressure losses in the intake system of the engine are decreased.

Figure 3:
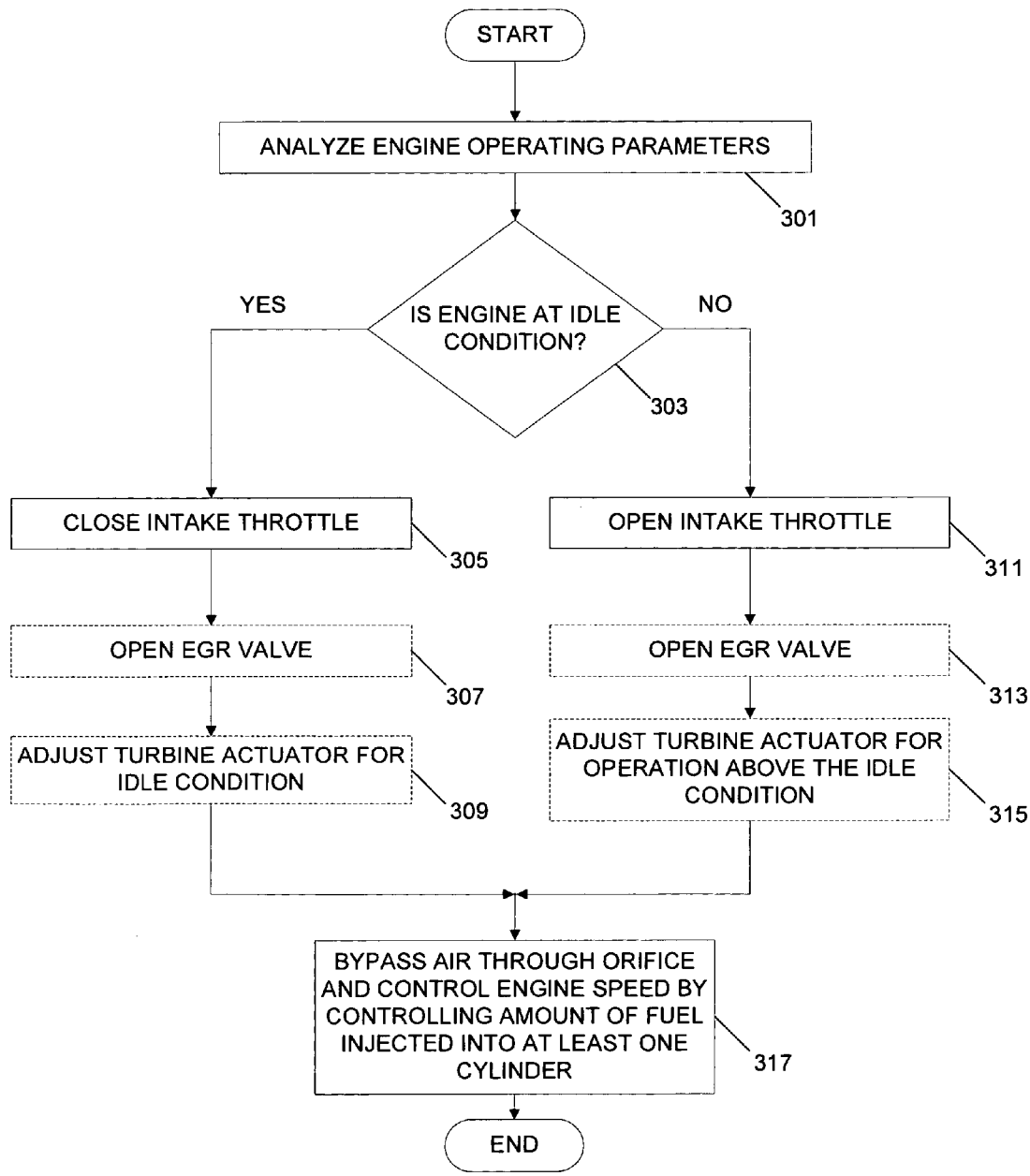
FIG. 3 is a flowchart for a method of bypassing a charge air cooler in an engine in accordance with the invention.

A method of operating a diesel engine having a charge-air cooler bypass is shown in FIG. 3. Engine operating parameters are analyzed in an engine controller in step 301. The engine controller makes a decision on whether the engine is at an idle condition in step 303 based on the analysis of the engine's operating parameters in step 301. The determination of the presence of an idle condition may advantageously be made based on the speed and the fuel command of the engine. If the engine is at the idle condition, the controller sends a command to the intake throttle 127 to close in step 305, and if required, also sends a command to the EGR valve 135 to open in step 307. The engine controller may also send a command to one or more turbine actuators to move to an appropriate position for engine at the idle condition in step 309. Air is bypassed through the orifice 141 and the engine idle speed is controlled through controlling an amount of fuel injected into at least one cylinder in step 317.

If the engine 100, 200 is not at the idle condition in the decision of step 303, the engine is considered to be at an above-idle condition and the controller sends a command to the intake throttle 127 to open in step 311, and if required, also sends a command to the EGR valve 135 to open in step 313. If the engine is in a changing or transient condition, the engine controller may send a command to close the EGR valve. The engine controller may also send a command to one or more turbine actuators to move to an appropriate position for an engine above the idle condition in step 315. Air is bypassed through the orifice 141 in step 317, and the engine speed is controlled by the amount of fuel that is injected into at least one cylinder.

Figure 4A:
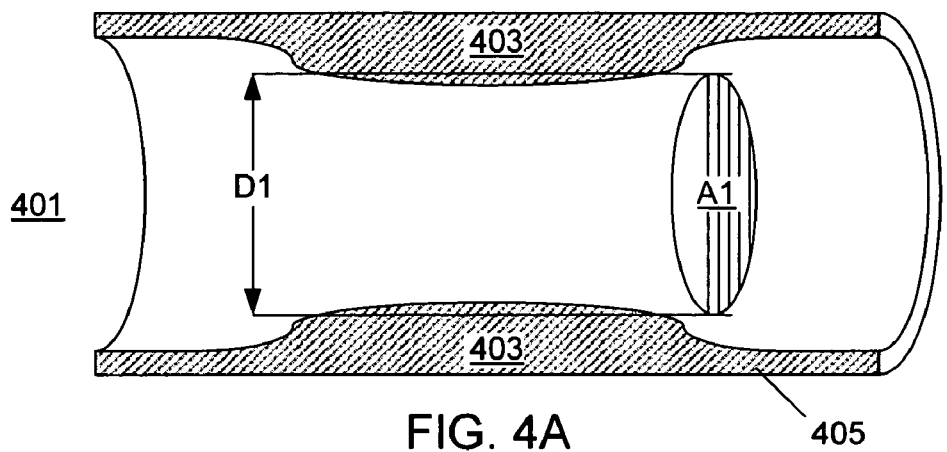
FIG. 4A is a section view of a fixed orifice in accordance with the invention.
Figure 4B:
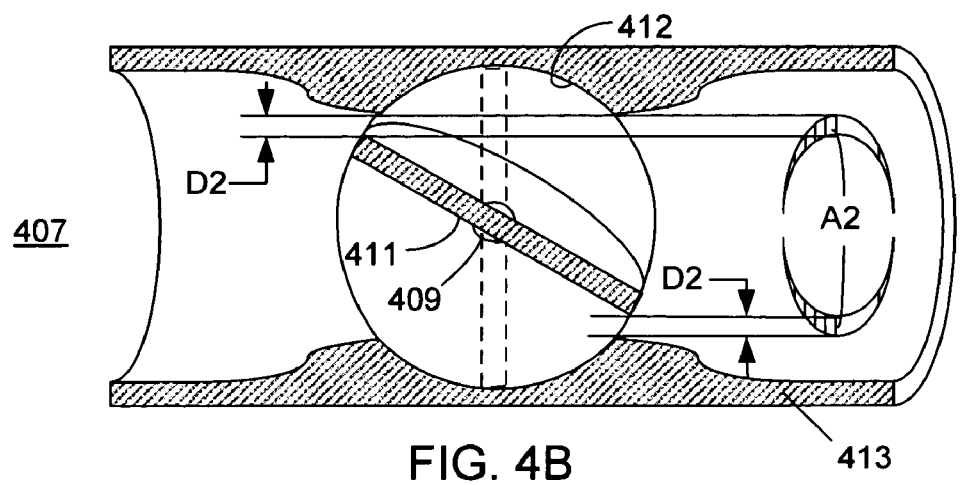
FIG. 4B is a section view of a butterfly valve in accordance with the invention.
Figure 4C:
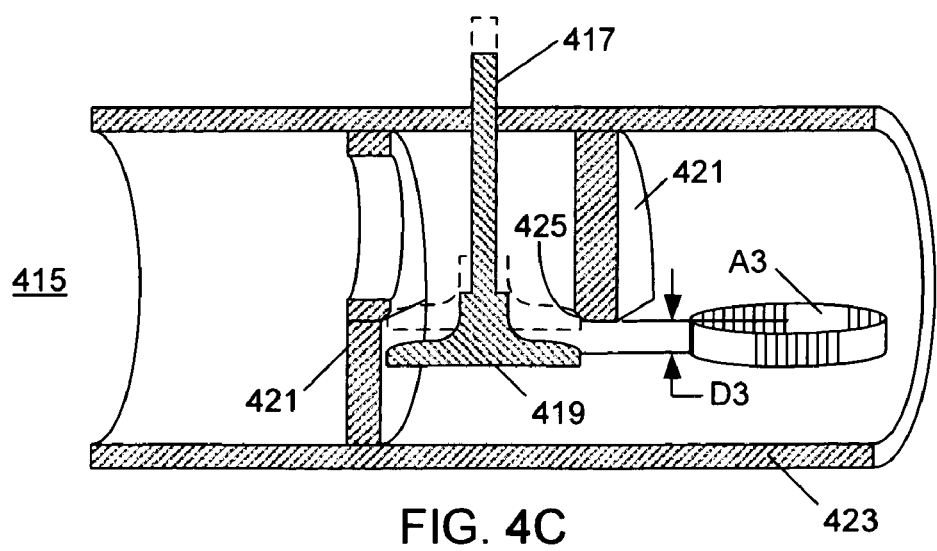
FIG. 4C is a section view of a poppet valve in accordance with the invention.

The bypass passage 139 contains an orifice 141. The orifice 141 may advantageously be a fixed orifice, but may also be a device capable of providing a function of a variable orifice, or variable flow area, as shown in FIGS. 4A-4C. A fixed orifice 401 is shown in FIG. 4A. The fixed orifice 401 includes a flow obstruction 403. The flow obstruction 403 is formed along a periphery of a tube segment 405, shown in section. An effective flow area may be calculated based on an effective diameter D1 of the orifice 401. The effective diameter D1 may be a distance in the tube section 405 that is about equal to the inner diameter of the flow obstruction 403. The effective diameter D1 may be used to calculate a flow coefficient of the orifice 141 as is known in the art. Use of a fixed orifice is advantageous because of simplicity and low cost. In the case when the orifice is a fixed orifice, the effective flow area is constant and is advantageously sized to handle airflow required by the engine 100 at or around an idle condition.

In an alternate embodiment, the orifice 141 may be a butterfly valve 407, as shown in FIG. 4B. The butterfly valve 407 includes a shaft 409 and a flapper 411. The flapper 411 may advantageously be enclosed in a formed bore 412 to enable finer flow control. The flapper 411 shown in a partially open position, with a closed position shown in phantom lines. The shaft 409 is rotatably connected to a tube segment 413, and the entire assembly is shown in section. A valve flow coefficient may be calculated based on an effective opening D2 of the flapper 411, as is known in the art. The shaft 409 may be operated with a linear actuator with linkages, or a rotary actuator (not shown). Either actuator may be eleotronic or mechanical, as is known in the art, and controlled by the engine controller. With variable flow capability, the butterfly valve 407 may be used to adjust the amount of air flowing through the bypass passage 139. Flow control capability in the bypass passage advantageously enables better performance tuning of the engine. In the case when the orifice is a variable orifice, the effective flow area is variable and is advantageously sized to handle airflow required by the engine 100 at or substantially above the idle condition. Use of the butterfly valve 407 enables selective cooling of the intake air of the engine 100 over the entire range of engine speeds and loads.

Another alternate embodiment of the orifice 141 is a poppet valve 415, as shown in FIG. 4C. The poppet valve 415 includes a shaft 417 and a poppet 419. The poppet 419 is enclosed in a valve housing 421. The poppet 419 is shown in a partially open position, with a closed position shown as an alternative. The poppet valve 415 is shown as a push-to-open valve, but may alternatively be a push-to-close valve configuration as is known in the art. The shaft 417 is axially moveable within a tube segment 423, and the entire assembly is shown in section. A valve flow coefficient and an effective flow area A3 may be calculated based on an effective opening D3 between the poppet 419 and a valve seat 425, as is known in the art. The shaft 417 may be operated with a electronic or mechanical linear actuator (not shown) controlled by the engine controller, as is known in the art. The effective flow area is variable and is advantageously sized to handle airflow required by the engine 100 at or substantially above the idle condition. Use of the poppet valve 415 enables selective cooling of the intake air of the engine 100 over the entire range of engine speeds and loads.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for operating a diesel engine comprising the steps of:
   compressing air in a compressor yielding charge air;
   routing the charge air to a charge air cooler through a hot air passage;
   cooling the charge air in the charge air cooler;
   passing the charge air from the charge air cooler to an intake throttle through a cool air passage;
   mixing the charge air with exhaust gas from an exhaust gas recirculation valve downstream of the intake throttle;
   bypassing a portion of the charge air from upstream of the charge air cooler to downstream of the intake throttle through a bypass passage; and
   restricting the portion of the charge air flowing through the bypass passage with an orifice.

2. The method of claim 1, wherein the orifice is at least one of a fixed orifice and a variable orifice.

3. The method of claim 2, wherein the variable orifice is at least one of a flapper valve and a poppet valve.

4. The method of claim 1, wherein the step of restricting is accomplished by adjusting an effective flow area of the orifice.

5. The method of claim 1, further comprising the steps of:
   analyzing engine operating parameters in an electronic controller; and
   determining an engine idle operating condition.

6. A method for operating a diesel engine comprising the steps of:
   analyzing engine operating parameters in an electronic controller;
   deciding on an engine operating condition in the electronic controller; controlling an intake throttle;
   wherein the step of controlling said intake throttle further comprising:
      closing an intake throttle when an engine idle operating condition is present; and
      opening the intake throttle when an engine operating condition above idle is present;
   controlling an idle speed of the engine solely by adjusting an amount of fuel injected into at least one cylinder;
   bypassing air around the intake throttle and a charge air cooler through an orifice; and
   controlling an exhaust gas recirculation valve;
      wherein the step of controlling said exhaust gas recirculation valve further comprising:
         opening an exhaust gas recirculation valve when the engine idle operating condition is present; and
         closing the exhaust gas recirculation valve when an engine operating condition is changing.

7. The method of claim 6, further comprising the steps of:
   when the engine idle operating condition is present, adjusting at least one turbine actuator and setting an effective flow area for the orifice;
   when the engine above-idle operating condition is present, adjusting the at least one turbine actuator for the engine operating condition above idle, and resetting the effective flow area for the orifice.

8. The method of claim 6, further comprising the step of adjusting the orifice with the electronic controller.

9. The method of claim 8, wherein the step of adjusting the orifice includes at least one of rotating a flapper shaft and moving a poppet.

10. A diesel engine comprising:
    a first turbocharger having a first turbine and a first compressor;
    a charge air cooler in fluid communication with an outlet of the compressor through a hot air passage;
    an intake throttle in fluid communication with an outlet of the charge air cooler through a cool air passage;
    a junction disposed downstream in fluid communication with the intake throttle;
    an intake system disposed in fluid communication with the junction;
    a bypass passage containing a flow restrictor disposed between the hot air passage and the junction; and
    an exhaust gas recirculation system having an outlet disposed in fluid communication with the junction.

11. The diesel engine of claim 10, wherein the bypass passage connects with the intake system at the junction, and wherein the bypass passage is directed toward an outlet of the exhaust gas recirculation system.

12. The diesel engine of claim 10, further comprising an engine controller, wherein the engine controller is operably disposed to control the intake throttle and an exhaust gas recirculation valve.

13. The diesel engine of claim 10, wherein flow restrictor is a fixed orifice.

14. The diesel engine of claim 4, wherein the fixed orifice flows an adequate airflow for operating the engine at an idle condition.

15. The diesel engine of claim 10, wherein the flow restrictor is a variable flow orifice.

16. The diesel engine of claim 15, wherein the variable flow orifice is at least one of a poppet valve and a butterfly valve.

17. The diesel engine of claim 16, further comprising a turbine bypass valve, disposed between the first turbine and a second turbine.

18. The diesel engine of claim 15, wherein the variable flow orifice is capable of flowing an adequate airflow for operating the engine over an entire range of engine speed and engine load.

19. The diesel engine of claim 10,
    wherein the junction has three inlets and an outlet;
    wherein a first inlet is fluidly communicating with an outlet of the intake throttle;
    wherein a second inlet is in fluid communication with an outlet of an exhaust gas recirculation valve;
    wherein a third inlet is fluidly communicating with the bypass passage; and
    wherein the outlet is in fluid communication with the intake system.

* * * * *